(12) United States Patent
Sundararaj et al.

(10) Patent No.: US 9,854,420 B2
(45) Date of Patent: Dec. 26, 2017

(54) METHOD AND SYSTEM FOR OPTIMAL EMERGENCY COMMUNICATION

(71) Applicants: Anand Sundararaj, Maharashtra (IN); Rajesh Sudhakar Thakur, Maharashtra (IN)

(72) Inventors: Anand Sundararaj, Maharashtra (IN); Rajesh Sudhakar Thakur, Maharashtra (IN)

( * ) Notice: Subject to any disclaimer, the term of this patent is extended or adjusted under 35 U.S.C. 154(b) by 0 days.

(21) Appl. No.: 14/770,834

(22) PCT Filed: Feb. 28, 2014

(86) PCT No.: PCT/IN2014/000134
§ 371 (c)(1),
(2) Date: Aug. 27, 2015

(87) PCT Pub. No.: WO2014/132272
PCT Pub. Date: Sep. 4, 2014

(65) Prior Publication Data
US 2016/0014585 A1 Jan. 14, 2016

(30) Foreign Application Priority Data
Feb. 28, 2013 (IN) .......................... 599/MUM/2013

(51) Int. Cl.
| | | |
|---|---|---|
| *H04B 7/00* | (2006.01) | |
| *H04W 4/22* | (2009.01) | |
| *G08B 25/00* | (2006.01) | |
| *G08B 25/01* | (2006.01) | |
| *G08B 25/10* | (2006.01) | |
| *H04M 1/725* | (2006.01) | |
| *H04B 15/00* | (2006.01) | |
| *H04M 11/04* | (2006.01) | |

(52) U.S. Cl.
CPC ............ *H04W 4/22* (2013.01); *G08B 25/004* (2013.01); *G08B 25/006* (2013.01); *G08B 25/016* (2013.01); *G08B 25/10* (2013.01); *H04M 1/72536* (2013.01)

(58) Field of Classification Search
CPC ............ H04M 11/64; H04M 2242/04; H04M 1/72536; H04W 4/02; H04W 4/22; H04W 76/007; G08B 25/016; G08G 25/004; G08G 25/006; G08G 25/016; G08G 25/10
USPC ....................................................... 455/521
See application file for complete search history.

(56) References Cited

U.S. PATENT DOCUMENTS

| | | | |
|---|---|---|---|
| 8,624,727 B2* | 1/2014 | Saigh ................... | H04W 4/025 340/539.1 |
| 2007/0207771 A1* | 9/2007 | Bowser ................ | G08B 27/005 455/404.1 |
| 2011/0207429 A1* | 8/2011 | Maier .................. | H04W 64/00 455/404.2 |

* cited by examiner

Primary Examiner — Huy C Ho
(74) Attorney, Agent, or Firm — Mark M. Friedman

(57) ABSTRACT

This invention relates to automatic delivery of messages, particularly to provide delivery of messages as a single instance message in which the user has the greatest probability of successful transmittance of the emergency message in one single instance of transmission.

40 Claims, 16 Drawing Sheets

General block diagram of the system

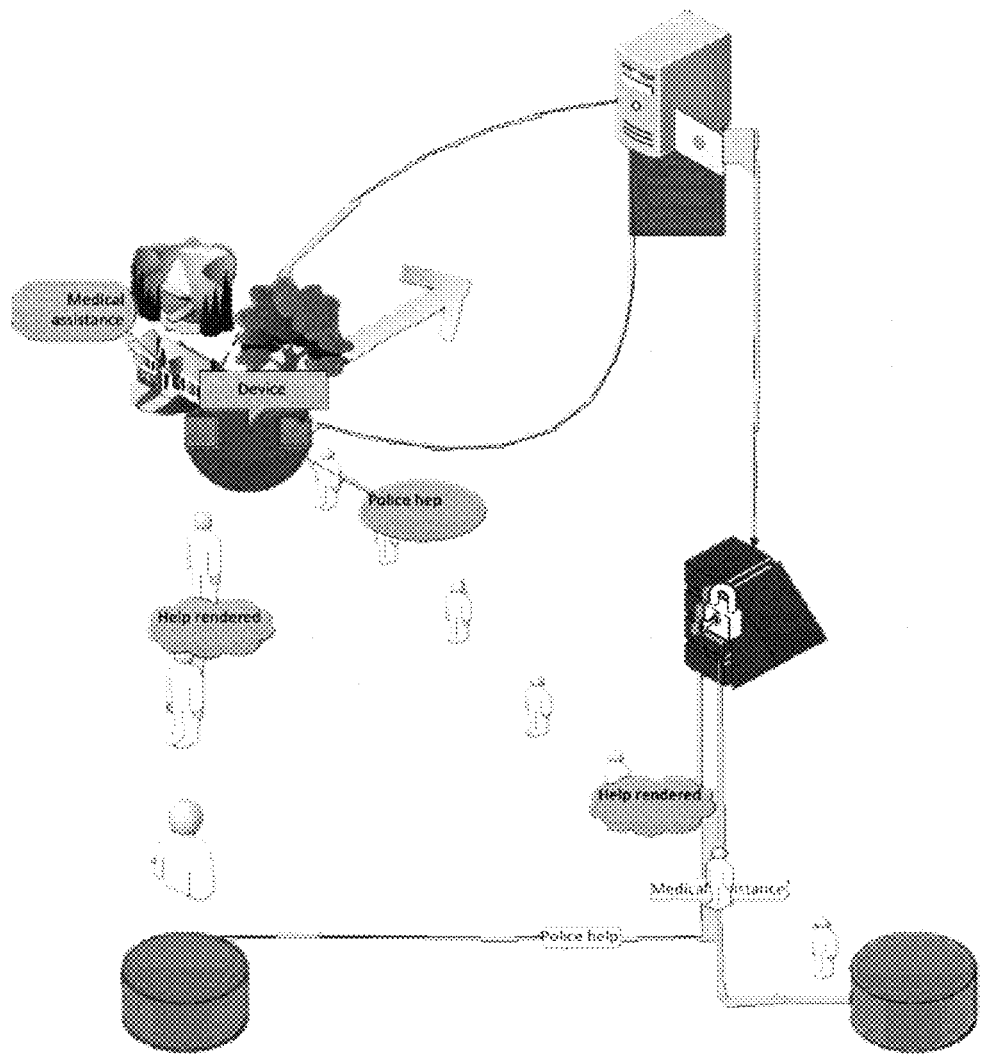
Fig. 1: General block diagram of the system

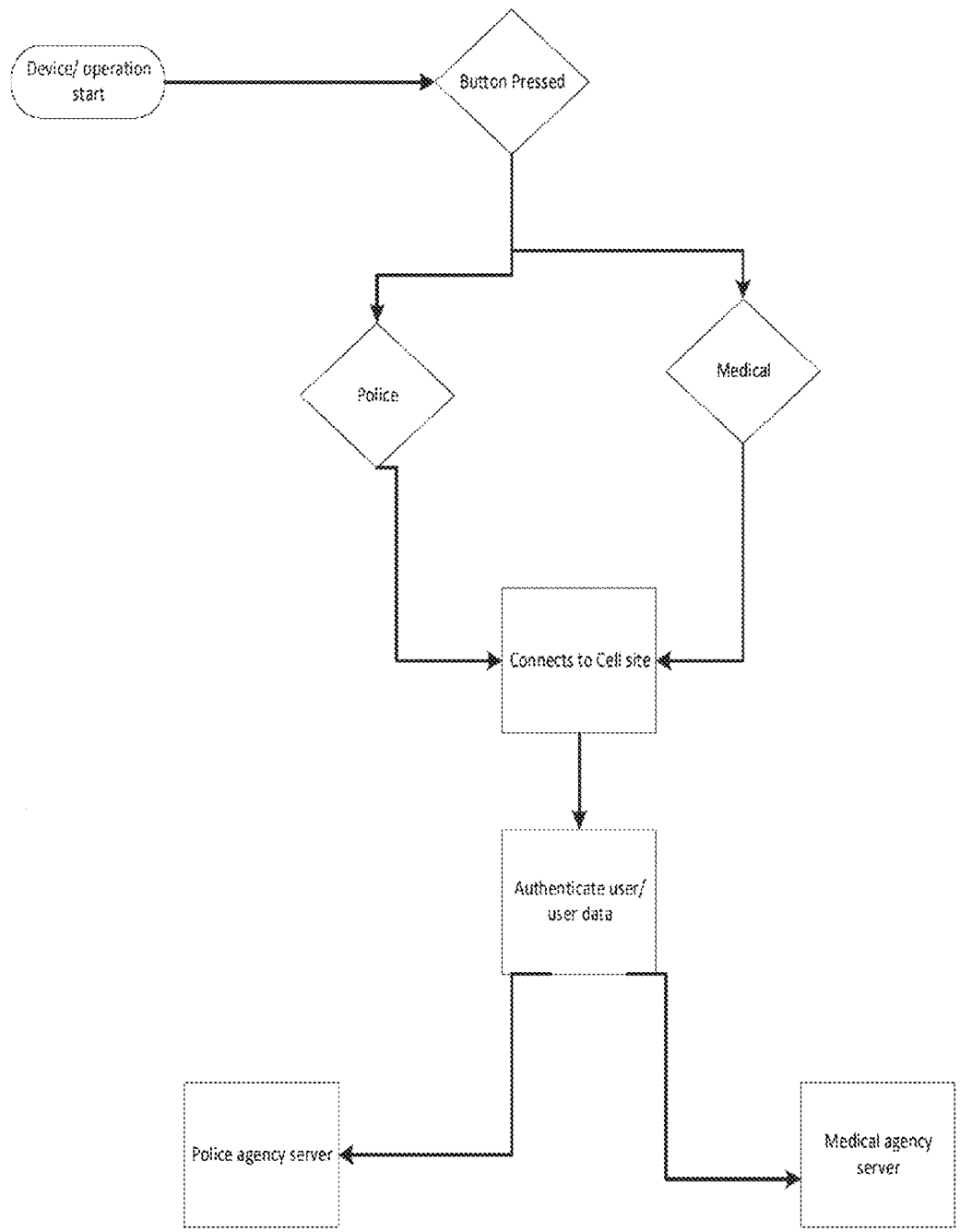
Fig 2: basic illustration of button pressed event

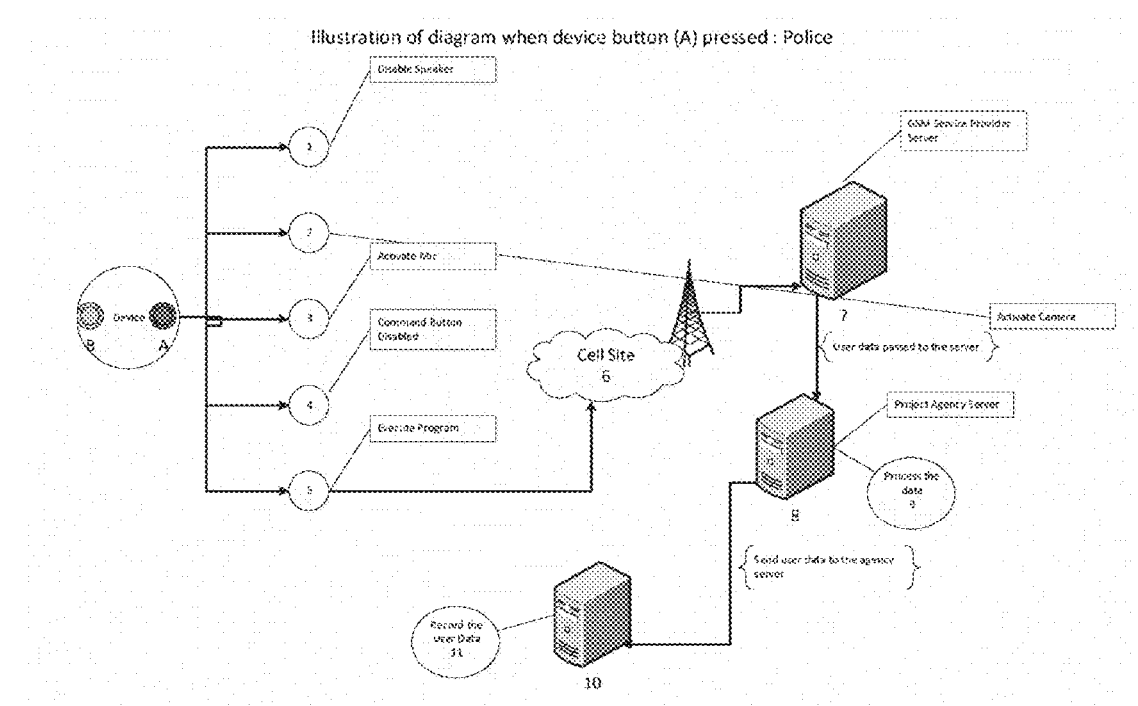
Fig 3A: Illustration of diagram when option (A) button pressed

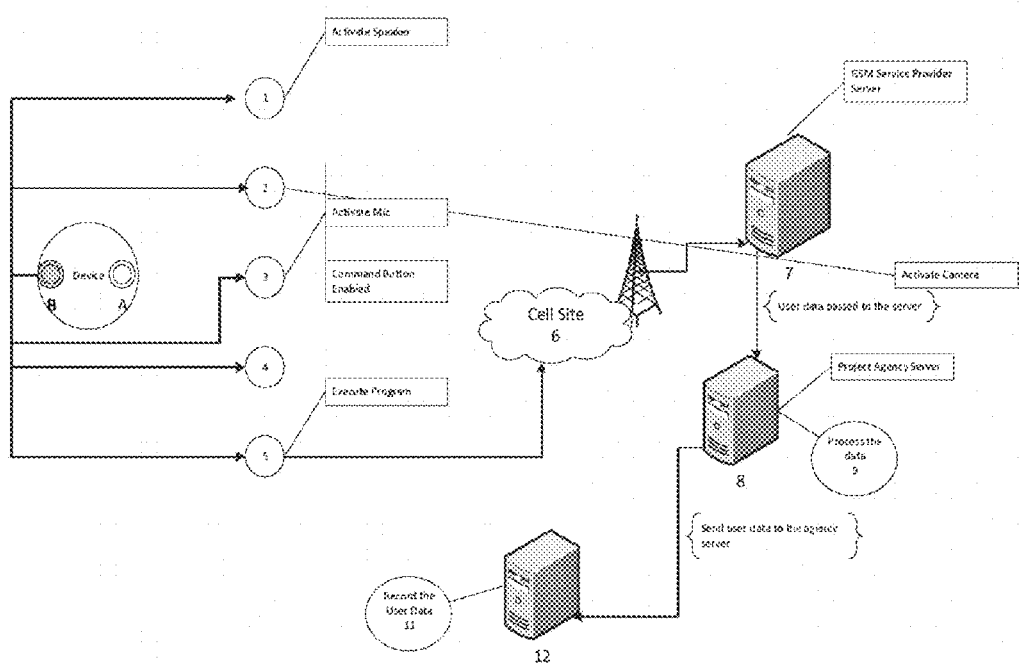
Fig 3B: Illustration of diagram when option (B) button pressed

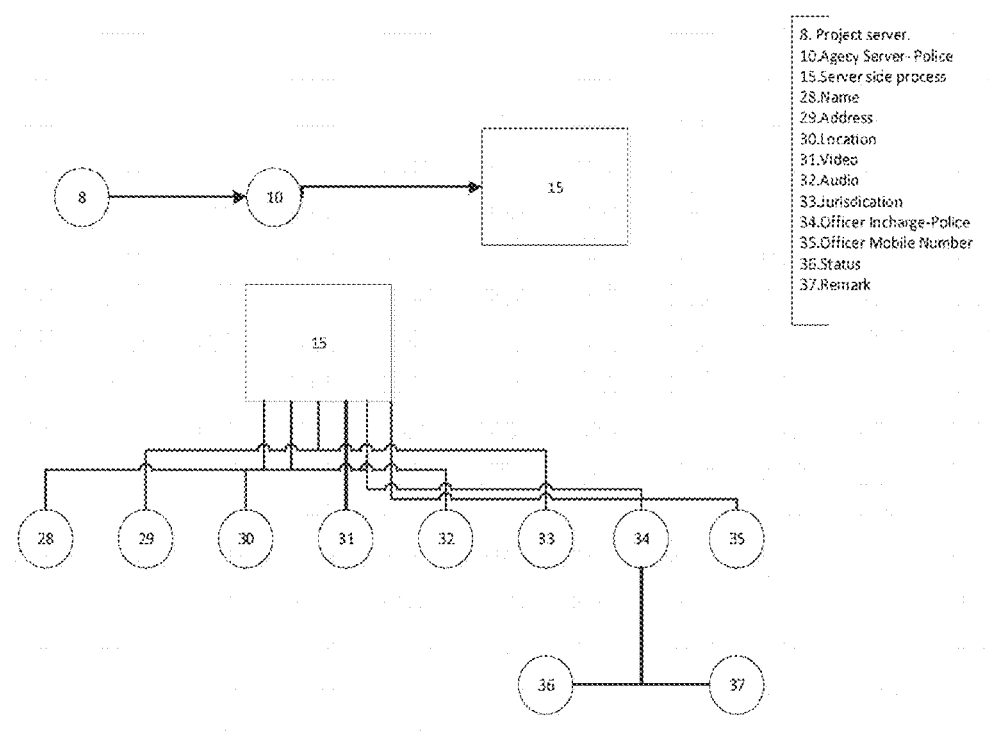
Fig 4 A: Illustration of series of action performed on button pressed (A)

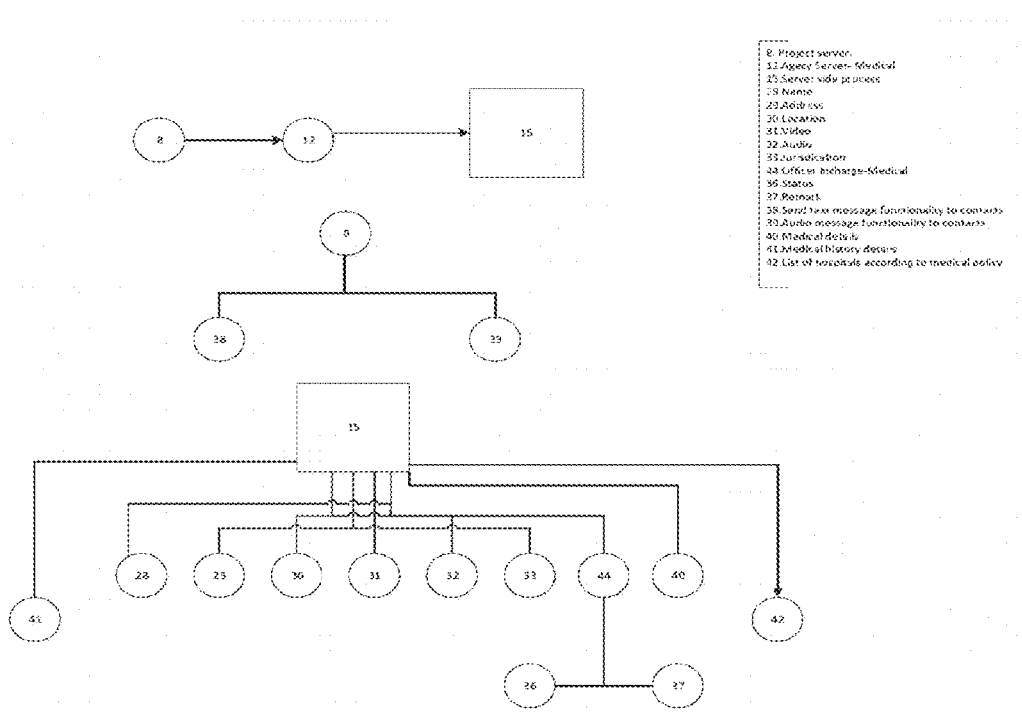
Fig 4B: Illustration of series of action performed on button pressed (B)

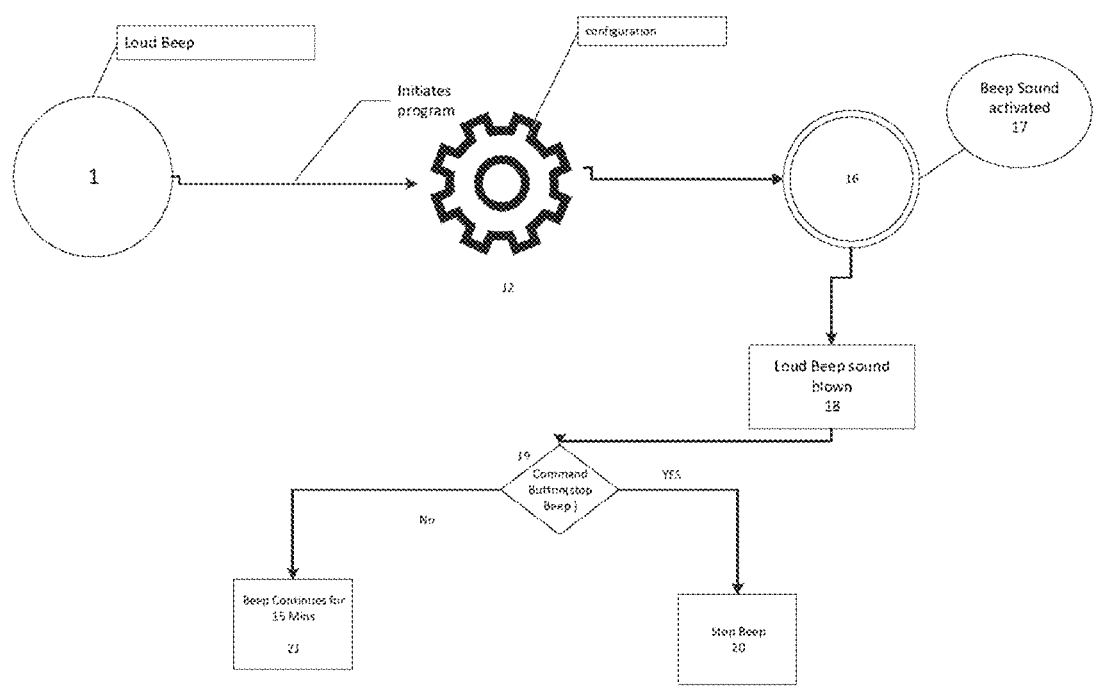
FIG 5: Illustrates Beep functionality

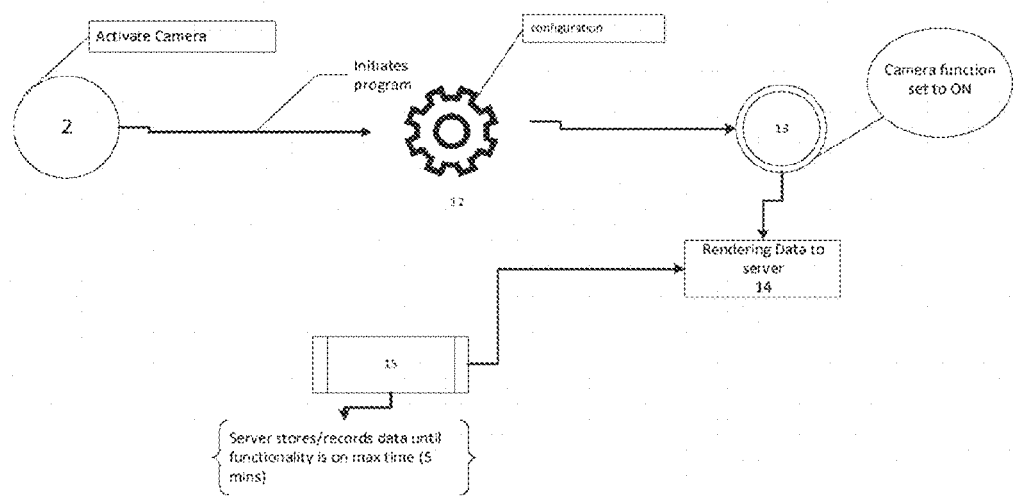
FIG 6: Illustrates Camera functionality

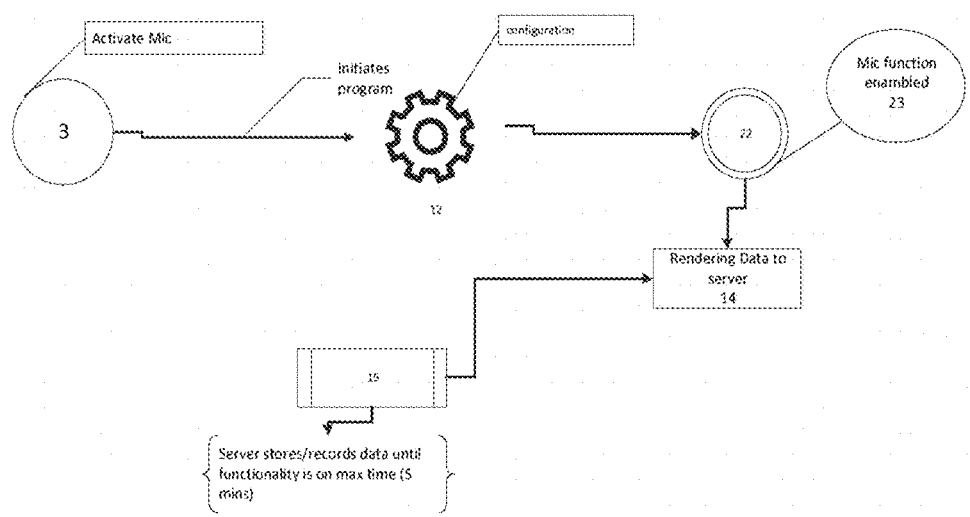
FIG 7: Illustrates Mic functionality

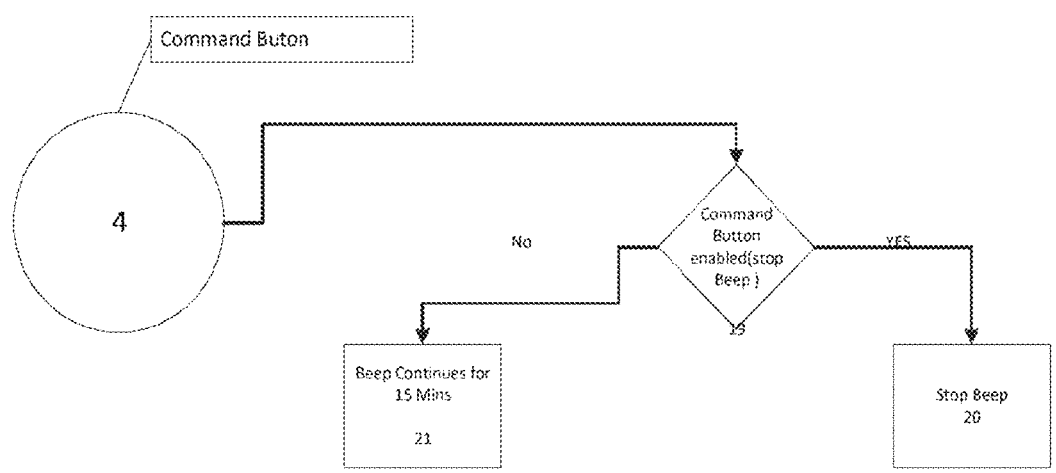
FIG 8: Illustrates Command button functionality

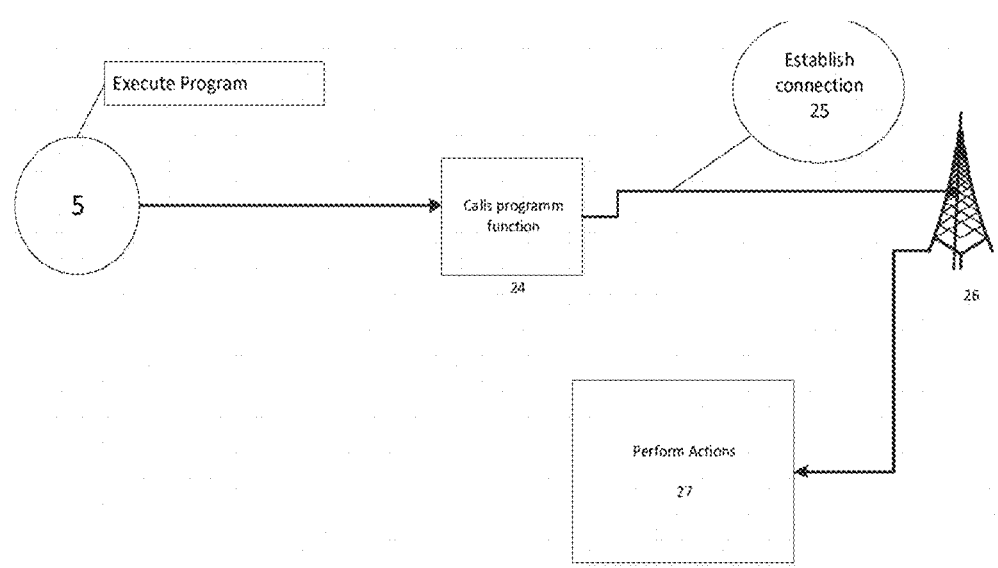
FIG 9: Illustrates execute program

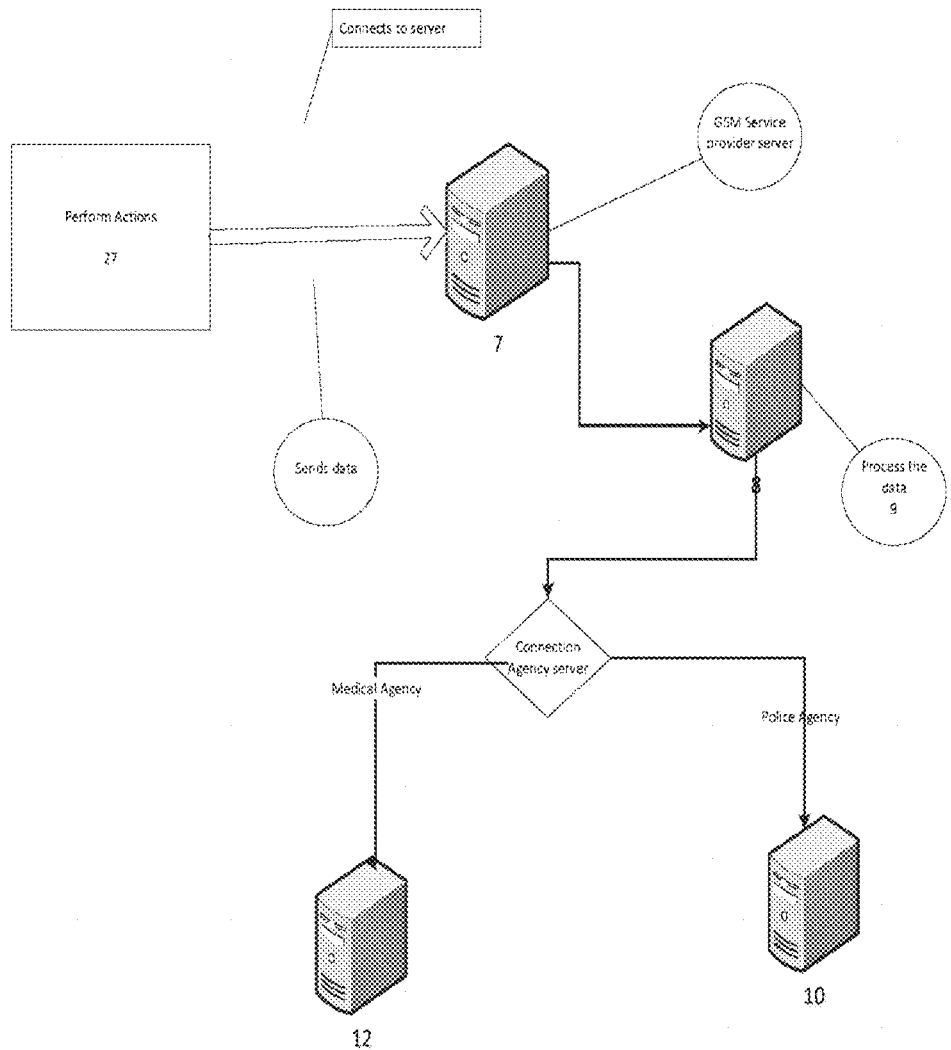
FIG 10: Illustrates perform actions functionality

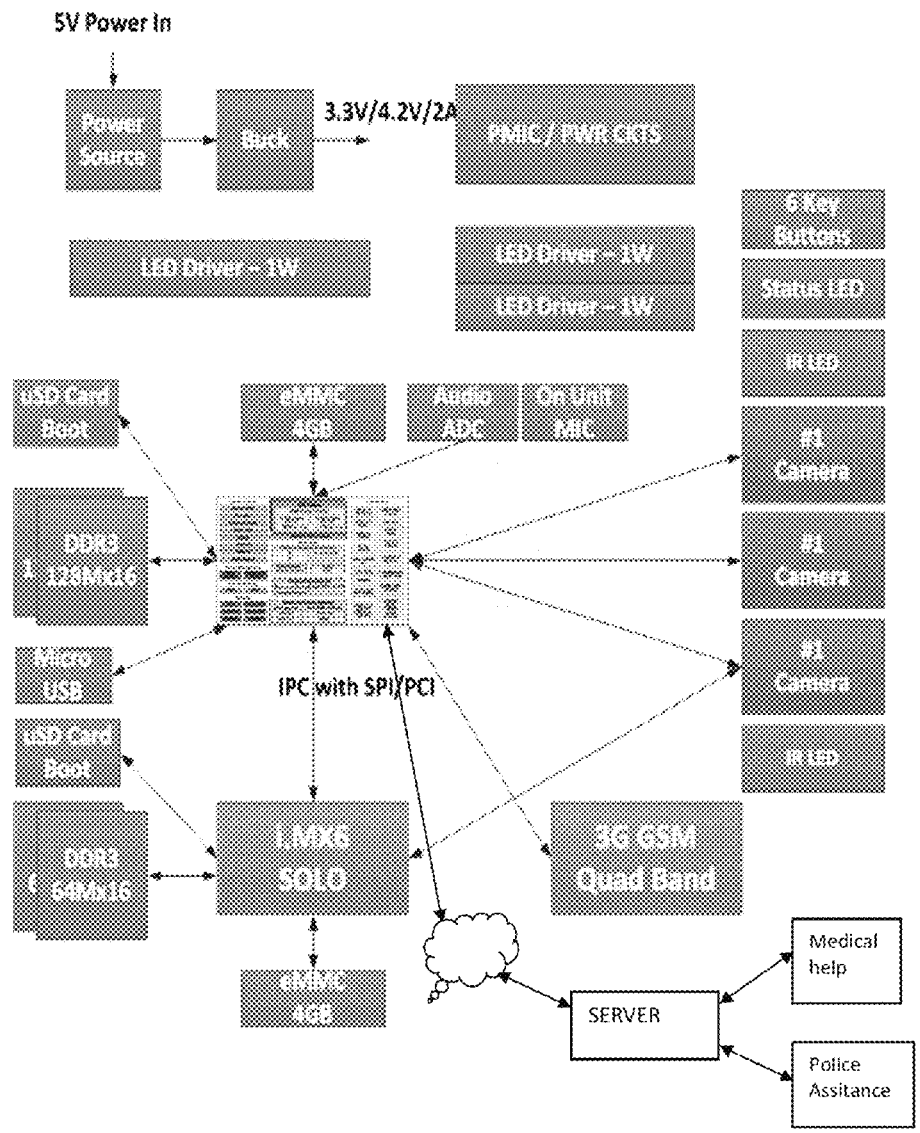
Fig 11. System architecture layout

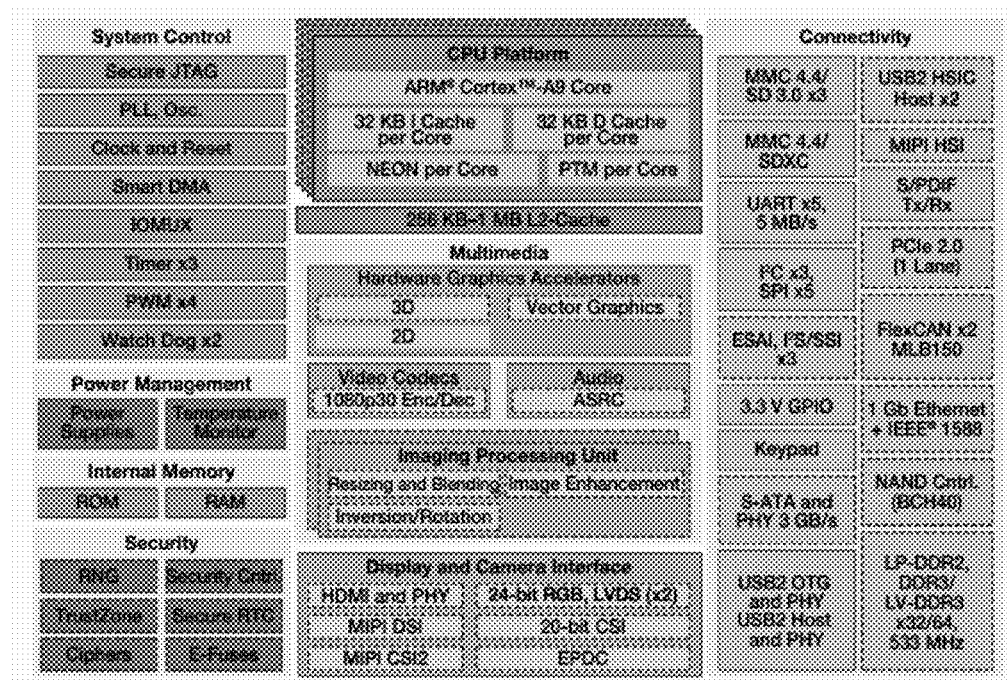
Fig 12: Processor architecture layout

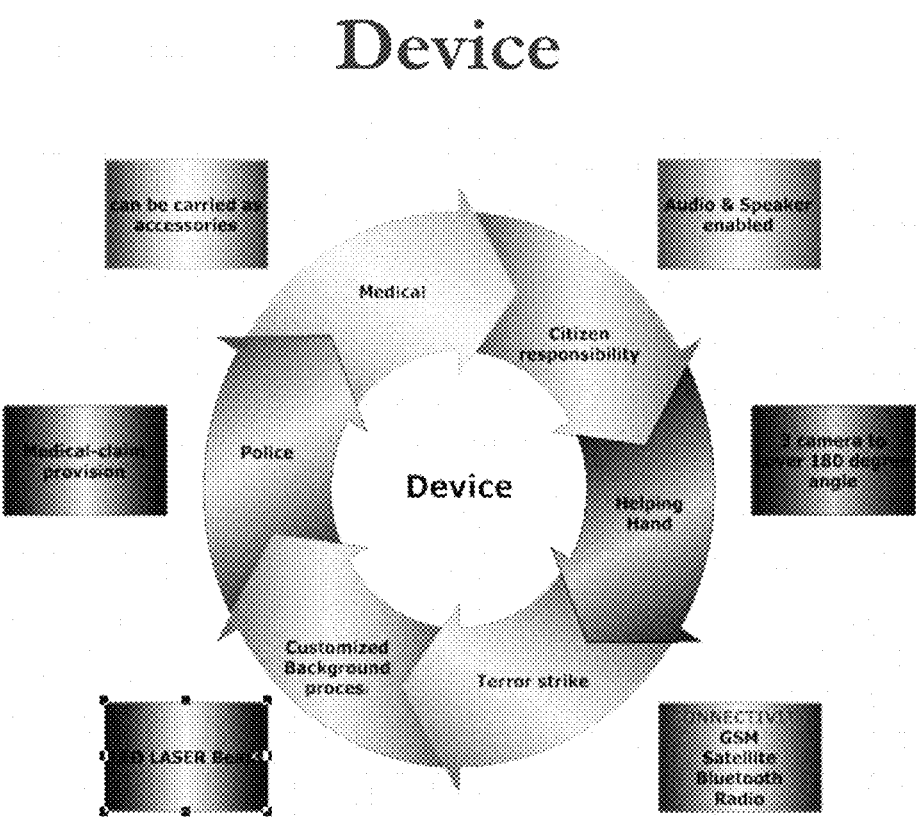
Fig. 13: Listing of device Features.

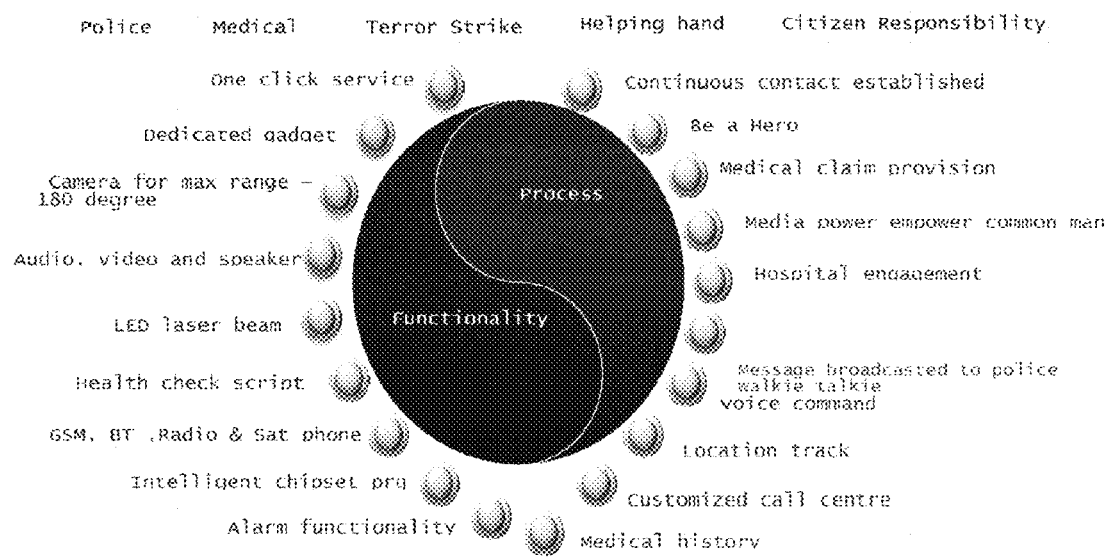
Fig. 14: User Device USP

METHOD AND SYSTEM FOR OPTIMAL EMERGENCY COMMUNICATION

FIELD OF THE INVENTION

This invention relates to automatic delivery of messages, particularly to provide delivery of messages as a single instance message in which the user has the greatest probability of successful transmittance of the emergency message in one single instance of transmission.

BACKGROUND ART

It is already well-known and is important that a personal in need has to be allowed to transmit messages may be such as SOS through an emergency Response System.

A Personal Emergency Response System (PERS) is an electronic device designed to let you summon help in an emergency.

There are three components to a personal emergency response system: A small transmitter, a communications console connected to the user's telephone, and (usually) a remote monitoring centre.

When the person using the system needs help, he or she presses the "HELP" button, typically worn around the neck or on a wrist band. That sends a radio signal to the console at the telephone, which then automatically dials the phone.

Many of the telephone consoles incorporate a speaker, so the monitoring center can communicate directly with the caller without the telephone itself being necessary.

If the PERS wearer does not respond to the monitoring center, or if the monitoring center can't determine the exact nature of the emergency, they will most commonly immediately contact emergency responders and stay on the line until help arrives.

It is a short coming that because a personal response system requires that the user be able to push the transmitter button to call for help, it will not be useful if the wearer is unconscious or otherwise unable to use the "HELP" button. Of course, nor will any other system is able to immediately and automatically call for help should the user be unable to.

All of these Personal Emergency Response Systems assume two things about the User that may not be true for many potential users: 1) that the person is conscious and cognizant when the emergency event occurs 2) that the person is fully committed to using the device when an emergency event occurs.

The scenario is even more disconcerting when personal loses the ability to comprehend what it is for.

For the reasons stated above, at least one of the reasons above, which will become apparent to those skilled in the art upon reading and understanding the specification, there is a need in the art for a system and method which overcomes the drawbacks associated with the prior art.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1 illustrates a system for Optimal Emergency Communication.

FIG. 2 is basic illustration of button pressed event

When a button is pressed in the device, the device first connects to the nearest cell site (towers), the cell site then passes this information to its own server and performs authenticity check, once the requestor passes authenticity check, request for the event is processed with user data and connectivity established between appropriate services (servers)

FIG. 3A illustrates diagram when option (A) button pressed A triggers for series of events to execute, (1.) is disabled, (2.) is activated, (3.) activated, (4.) disabled, (5) is executed, (6.) is fetches user data and starts internal process with its own (service provider) server (7.), where series of events are performed after authenticity check and processed data is passed to present invention server (8.), (8.) sends processed data to agency server (police) along with sequential actions of events, (10.) This is police agency server where data is recorded.

Police:

Data will be recorded in Police agency server, incidents/events will be flashed in police control room, police agency has disburse the team for the requestors aid based on priority of the case and functional procedure of police working.

Advantage of Present Invention Vs Existing 100 Help Line Available:

100 has to be dialed from mobile phone/landline

It is a voice based service system→when in distress unlawful incident occurrence requestor has to brief the details over call and ask for assistance help required, which may not be possible during critical scenario.

the present functionality ensures all the cases are addressed, which is big drawback/complaint area for 100 services.

The present invention also serves as opportunity to take a proactive measures in stopping unlawful incidence from happening (between the time police arrives for the aid) by sending BT signals to nearest 100 mts radius approximately with gps location and push message of person in trouble, expecting someone to come for aid before police reaches. Also send message on police walkie talkies.

Video and Audio data provided from the scene, holds good chance to serve as evidence in court of law.

The present invention functionality also gives opportunity to help someone in distress rather than turning blind eye in event of distress or witness to crime FIG. 3B illustrate diagram when option (B) button pressed A triggers for series of events to execute, (1.) is activated, (2.) is activated, (3.) activated, (4.) activated, (5) is executed, (6.) is fetches user data and starts internal process with its own (service provider) server (7.), where series of events are performed after authenticity check, and processed data is passed to PRESENT INVENTION server (8.), (8.) sends processed data to agency server (police) along with sequential actions of events, (12.) This is medical agency server where data is recorded.

Medical

Present Invention Vs 108 Existing Services

Requestor has to dial 108 from mobile/landline

Issues/concerns when 108 are busy, communication officer is engaged in another call and all lines are busy.

It is a voice base system where requestor has to narrate the tale problems, communication officer though equipped and efficient to understand and the problem in claimed 30 seconds practically becomes difficult giving accuracy.

In case of present invention narrating/explaining the problem is not obligatory

Video and audio data provided to agency to ascertain the criticality and emergency Present invention facilitates in locating nearby specialty hospitals appropriate for the problems (viz: cardiac attack specialty hospital list will be popped out)

During emergency requestor/caller may not be in state to call and speak to 108

Prank calls can be avoided, where genuinanity of the call can be ascertained referring videos saving resource which can be vital to render services in largely populated country as ours Loud beep alarm will be blown from PRESENT INVENTION crying for help to raise alarm to onlookers or person nearby, who can come to their aid If the caller has medical insurance policy attached/enrolled, list of hospitals in radius of 5-10 kms will be popped up to agency server, nearest hospitals can be located by agency team.

Text messages will be sent to selected contact registered along with family doctor if registered Audio call message (automated message) to all contact will repeat 3 times to all contact, triggering every 5 minutes unless response heard from the contact (viz: Audio message saying "Mr./Mrs. ABC is in medical emergency, require your assistance support immediately, please say "YES" if you understand the message")

Medical history of the caller will be recorded and popped up in medical agency server (viz: alergetic to medicines, ailing disease, etc)

FIG. 4A is an illustration of series of action performed on button pressed (A) (8.) as per the present invention server sends user data to Agency server (10.) which initiates (15.) server side process. (15.) Server process records 28. Name, 29. Address, 30. Location, 31. Video, 32. Audio, 33. Jurisdiction, 34. Officer In charge 36. Updates status and 37. Remarks FIG. 4B is an illustration of series of action performed on button pressed (B) (8.) present invention server sends user data to Agency server (12.) which initiates (15.) server side process. Sequentially present invention server executes process (5) which here triggers events (38.) send message functionality and (39.) Audio message functionality. (15.) Server process records (28.) Name, (29.) Address, (30.) Location, (31.) Video, (32.) Audio, (33.) Jurisdiction fetches and records (40.) Medical details (medical insurance, policy) (42.) Medical details of the requestor and list of hospitals according to medical policy/insurance. (44.) Officer In charge (36.) Updates status and (37.) Remarks FIG. 5 is an illustrates Beep functionality From (B.) button pressed, initiates program configuration setup executes program (12.) to execute beep sound, (17.) beep sound is now activated moves forward by (18.) blowing beep sound, (19.) command button to stop in present invention device is enabled and perform actions (20) stop, (21) continue beep sound for 15 minutes.

FIG. 6 illustrates Camera functionality From (A) or (B.) button pressed, initiates program (12.) configuration setup executes program to set (13.) camera ON, (14.) Renders data, (15.) Records data to present invention server (this functionality of storing may also by pass PRESENT INVENTION server to reach appropriate agency server based on agreement and constitution law for state.

FIG. 7 Illustrate Mic functionality From (A) or (B.) button pressed initiates program (12.) configuration setup executes program to set (22.) Mic ON, (23.) Mic function enabled, (14.) Renders data, (15.) Records data to present invention server (this functionality of storing may also by pass present invention server to reach appropriate agency server based on agreement and constitution law for state.

FIG. 8 illustrate Command button functionality From (B) Button pressed, (4) command button to (19.) stop in present invention device is enabled and perform actions (20) stop, (21) continue beep sound for 15 minutes FIG. 9 is an illustration of execution of program From (A) or (B) Button pressed, (5.) execute program is triggered, (24.) calls program functions which first initial set up in (25.) establishing connection with (26) cell site and move forward with (27) perform appropriate actions functionality FIG. 10 illustrate perform actions functionality (27.) sends data to (7.) GSM service provider server (26.), (8.) processing data in PRESENT INVENTION server (9.) and then connects to Agency server (12.) or (10.)

FIG. 11 illustrate System architecture layout

FIG. 12 illustrate Central Processing Unit architecture layout.

FIG. 13 illustrate Listing of device Features.

FIG. 14 illustrate User Device USP

SUMMARY OF THE INVENTION

This invention relates to automatic delivery of messages, particularly to provide delivery of messages as a single instance message in which the user has the greatest probability of successful transmittance of the emergency message in one single instance of transmission. The system of the present invention includes but does not limit to Video Camera, Picture Camera, Speaker, Mic, Encapsulated buttons, Button (helping hand), Light beam, Fragrance diffuser, Command button (stop), Button CR (Citizen responsibility), TS (terror strike), sensors for fire gas leaks Smoke blow out. Upon activation the device initiate connection processes, establishes connectivity through authenticity check and performs its usual connectivity procedures to ascertain the request call reaches to the server and logs data are recorded in the database for the requestor. The server opens connectivity to appropriate agency server and data then traverses to agency server. Further to attending the emergency, as soon as the connection field is updated with stop record, disconnection process executes and device gets disconnected from the server.

DETAILED DESCRIPTION OF THE PREFERRED EMBODIMENTS

Reference will be made to embodiments of the invention. Although the invention is generally described in the context of these embodiments, it should be understood that it is not intended to limit the scope of the invention to these particular embodiments.

The above and other objects, features, and advantages of the present invention will be more clearly understood from the following detailed description.

The embodiments herein may provide a method and system for delivery of messages may be as a single instance SOS. Further the embodiments may be easily implemented in various communication systems such as mobile phone, Network integrated sever based communication systems, tablet PC systems, desktop systems and all other communication equipment/systems. The method of the invention may also be implemented as application performed by a stand alone or embedded system.

The invention described herein is explained using specific exemplary details for better understanding. However, the invention disclosed can be worked on by a person skilled in the art without the use of these specific details.

References in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Hereinafter, the preferred embodiments of the present invention will be described in detail. For clear description of the present invention, known constructions and functions will be omitted.

Parts of the description will be presented in terms of operations performed by an embedded system, using terms such as data, state, link, fault, and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the embedded system. The term embedded system includes general purpose as well as special purpose data processing machines, switches, and the like, that are standalone, adjunct or embedded.

To secure every human being and give right to live freely and securely in independent country, as per one of the embodiment of the present invention, the device of the present invention have plurality of encapsulated buttons, where at least one indicates assistance required from police agencies and at least one indicates support assistance from Medical agencies. Based upon need and requirement user/person can use any of this support required during any kind of medical emergencies or during circumstance of any anti-social deeds when in difficulty. The present invention is featured such that it can be used in various circumstances like Bomb blast, attempt of theft, rape, molestation, heart attacks, when found stranded in critical medical emergencies or in any kind of anti-social offense circumstance.

In one of the embodiment of the present invention the system encapsulate plurality of camera (cam)s. As per the system and the method of the present invention at least one cam will get activated as soon as persons sets up the help button and all the images from at least one of the cam will be sent to server which will have data similar to cctv footage which can be used as evidence investigation/help by police medical officers. The system has push buttons to send alarm for help to police/medical command can also be activated via voice command This present invention works as an safeguard to human life against any medical/unlawful deeds or events like (accidents, theft, kidnapping, bombblast, natural disaster viz earthquakes)

As per one of the embodiment of the present invention the system/device of the present invention can be worn as a wrist strap/necklace or attached to any accessories your are wearing ensuring that device has full view (not been obstructed by any of your garments accessories etc), so that during criticality the system can be activated appropriately and proper assistance can be rendered.

As per one of the embodiment of the present invention, the defined system may provide complete flexibility in terms of length of the message to be transmitted may be as a single SOS.

As per one of the preferred embodiment of the present invention the method and system for emergency response comprise of Video Camera, Picture Camera, Speaker, Mic, Encapsulated buttons, Button (helping hand), Light beam, Fragrance diffuser, Command button (stop), Button CR (Citizen responsibility), TS (terror strike), sensors for fire gas leaks Smoke blow out As per one of the preferred embodiment of the present invention the method and system for emergency response comprise of Connectivity module.

As per one of the preferred embodiment of the present invention the method and system for emergency response comprise of Connectivity module wherein incase of standard coverage available the connectivity module on button pressed event, i.e. when the requestor presses button (A/B), initiate connection processes, internally it dials the number (eg 1111) which reaches base station of the cellular service provider, service provider recognizes the caller, performs authenticity check and performs its usual connectivity procedures to ascertain the request call reaches to the server and logs data are recorded in the database for the requestor.

As per one of the preferred embodiment of the present invention the method and system for emergency response comprise of Connectivity module wherein incase of standard coverage available the connectivity module perform function of calling to customer care number, the call lands in the call centre and the phone that is not busy rings and you are connected where customer care executive responds to your call/queries.

As per one of the preferred embodiment of the present invention the method and system for emergency response comprise of Connectivity module wherein on initiating the connectivity by the communication module gets connected to the server which is configured and equipped to receive/record data to the database (parallel calls at a time).

As per one of the preferred embodiment of the present invention the method and system for emergency response the call request takes nearest route that is specifically designed to receive data for the region where the user is located.

As per another embodiment of the present invention the method and system for emergency response there will be multiple server or mirror servers which are designed and implemented to cut down the travel route time.

As per one another embodiment of the present invention the method and system for emergency response the server opens connectivity to appropriate agency server and data then traverses to agency server.

As per one of the preferred embodiment of the present invention the method and system for emergency response comprise of Connectivity module wherein incase of no standard coverage available (protocol identification Like satellite, BT, FM) the connectivity module on button pressed event, i.e. when the requestor presses button (A/B), initiate connection processes. When the event fails or request time out event occurs for the requested connection, other functionality of the device like 1, 2, 3, 4, 5 (execute functions of enabling mic, speaker, cam 1, cam 2 and parallel execution of programs for appropriate connection request) executes, data is stored in local device, along with text file created with desired message for appropriate agency like:

Police "ATTENTION!!!!Mr Abc, his location, address, his contact numbers, requires your help immediately".

Medical "ATTENTION!!!!Mr Abc, his location, address, his contact numbers, is need of medical help".

As per one of the preferred embodiment of the present invention the method and system for emergency response comprise of Connectivity module wherein incase of no standard coverage available protocol identification when none of the connectivity is available/working then the connectivity module keep executing the connection initiation/request until it gets coverage to send/dispatch the created file to relevant agency". Once connectivity is established data file created with video and audio data is sent to server. Current standard time for connectivity to the GSM service provider is 2 milli seconds-max 6 seconds. After repeatedly failure of connection request and failure time exceed specified time limit (example 10-15 mins) satellite phone connectivity can be established to follow connectivity process/module.

As per one of the preferred embodiment of the present invention the method and system for emergency response Disconnection of connectivity module is sole ownership and call of the agent server's admin/controller in charge, there is no option from device to disconnect the connection, incase of A/B button pressed

| Name | Address | Location | Video | Picture | Audio | connection |
|------|---------|----------|-------|---------|-------|------------|
| abc  | abc     | abc      | abc   | abc     | abc   | continue   |
| abc  | abc     | abc      | abc   | abc     | abc   | continue   |
| abc  | abc     | abc      | abc   | abc     | abc   | continue   | default value in the database

| stop | value changed to stop

As per one of the preferred embodiment of the present invention the method and system for emergency response, as soon as the connection field is updated with stop record, disconnection process executes and device gets disconnected from the server.

This is specifically conceptualized and thought out process to give complete authority to the person in charge to take a call on disconnection process on basis of the case/criticality, as it is based on case to case basis, depending on the need and requirement.

As per one of the preferred embodiment of the present invention the method and system for emergency response, whenever there is a interruption or call drop during ongoing connection, the program automatically redials connectivity module and tries to establish connection again, if there is a drop of connectivity more than 2 time to a ongoing connection, alert messaged is flashed to the respective agencies along with rendering of the data which is continuous process till the connection lasts. The message notifies the agencies to build up an action plan and expecting delayed data, etc.

As per one of the preferred embodiment of the present invention the method and system for emergency response, the system perform functions in response to the commands such as but not limited to Button pressed A, Button pressed B, Helping hand button, CR Button (citizen responsibility), TS (terror strike) Command button to stop audio message, Audio command: voice etc.

As per one of the preferred embodiment of the present invention the method and system for emergency response, the system perform functions in response to the commands wherein when button A is pressed for police assistance Connectivity module executes/establish connectivity in any of the case of (1 in case of standard coverage available) standard coverage connectivity or (2 failover connectivity-) failover connectivity.

As per one of the preferred embodiment of the present invention the method and system for emergency response, the system perform functions in response to the commands wherein when button A is pressed for police assistance, Connectivity module along with establishing connectivity executes functionality such as but not limited to multiple/plurality of camera activation enabling mic, executing program triggers which performs actions such as As per one another embodiment of the present invention the method and system for emergency response, integrated with multiple cameras (equipped with desired audio and video components) this functionality serves better chance of gathering better, clearer and concrete view during occurrence of events/incidents.

As per one of the preferred embodiment of the present invention the method and system for emergency response audio gets recorded to the local device and buffered video is parallely transferred to the server (project server to agency server or directly to police agency server As per one of the preferred embodiment of the present invention the method and system for emergency response the Server performs function to include fields to the database in the server, the fields includes but not limited to name, address, contact—details of all the specified contact, user location, video, audio, jurisdiction, status, remark.

As per one of the preferred embodiment of the present invention the method and system for emergency response at the Server event gets triggered as soon as records are inserted for the user in the database, event is triggered which broadcast name location and audio message received from requestor to police walky talky.

As per one of the preferred embodiment of the present invention the method and system for emergency response, the system perform functions in response to the commands wherein when button B is pressed for medical assistance Connectivity module executes/established in any of the case of (1 incase of standard coverage available) standard coverage connectivity or (2 failover connectivity-) failover connectivity.

As per one of the preferred embodiment of the present invention the method and system for emergency response, the system perform functions in response to the commands wherein when button B is pressed for medical assistance Connectivity module along with establishing connectivity executes functionality such as but not limited to multiple camera activations, enabling mic, activating speaker, executing program triggers which performs actions such as but not limited to:

Recording video through camera 1 to the local device and parallel transfer buffered video to the server (project server—to agency server or directly to medical agency server)

Recording video through camera 2 to the local device and parallel transfer buffered video to the server (project server—to agency server or directly to medical agency server) As per one another embodiment of the present invention the method and system for emergency response multiple cameras integrated to capture video and picture, this functionality serves better chance of gathering better, clearer and concrete view during occurrence of events/ incidents. (The central vigilance commission, Government of India website states that video and picture data can be used as evidence for lodging complaints (reff: http://www.vigeye.com)

As per one of the preferred embodiment of the present invention the method and system for emergency response audio gets recorded to the local device and buffered video is parallely transferred to the server (project server—to agency server or directly to medical agency server)

As per one of the preferred embodiment of the present invention the method and system for emergency response Speaker plays recorded message "Please help Person requires medical attention, this will be multilingual message", you can stop the audio by pressing highlighted button"

As per one of the preferred embodiment of the present invention the method and system for emergency response the Server performs function to include fields to the database in the server, the fields includes but not limited to name, address, contact—details of all the specified contact, user location, video, audio, jurisdiction, status, remark, Medical details—Family Dr. number, Medical history details—Alergetic, diabetic, . . . , Medical claims details policy/insurance, List of hospitals (with reference to medical insurance list), Specialty hospitals As per one of the preferred embodiment of the present invention the method and system for emergency response at the Server event gets triggered as soon as records are inserted for the user in the database, events are triggered to perform actions including but not limited to triggering audio message functionality to all registered contact, SMS to all registered contact.

As per one of the preferred embodiment of the present invention the method and system for emergency response, wherein Helping hand functionality is used by activating helping hand button when user/individual wants to help someone is distress, he sees some unwarranted thing antisocial thing, gang fight, molestation, etc. Where he wants to go and save someone is distress, but you could not do so because you do not want to get involved, you are weak, you don't want to get into browl, etc. . . . . . Just press the helping hand button and you get this incident notified to police agency, further actions and rescue carried out by police. The system achieve said action through Connectivity module which initiate and execute parallel events such as but not limited to multiple camera activation, enabling mic. This function is specifically designed to bring particular event/incident into notice of police for them to jump into action. For stipulated time video/audio/picture is captured, data is then sent to Police agency server, and then connection is disconnected.

As per one of the preferred embodiment of the present invention the method and system for emergency response, wherein CR functionality may be activated by activating CR button. The specific function of CR button is Citizen Responsibility, when ever individual sees things episodes of events and has a gut feeling to expose the episode in his rights as a responsible citizen, he/she can make use of the CR button. This functionality is a tie-up with media (Media partner: times now, Zee, IBN, etc. . . . one of the media) wherein a user may Report an activity, stand up against any episode event of occurrence against citizen, this may include but not limit to Road facility, School/college irregularity, Illegal structure/office etc., Corruption etc. This gives media, power to the issue. On activating this button event occurs wherein Connectivity module is called, followed by parallel events such as multiple camera activated, mic enabled, Voice over can be added/recorded during connectivity of the reported issue. Connectivity remains active until user wants to keep it open; it closes/disconnects on double (twice) pressing the same button again. Video and audio gets recorded to the media server, Media owns all the rights and responsibility to broadcast recorded events.

As per one of the preferred embodiment of the present invention the method and system for emergency response Command button may be pressed to stop audio message played during medical emergencies (i.e. on press of button B) is stopped.

As per one of the preferred embodiment of the present invention the method and system for emergency response wherein Audio command is an option which uses mic for input, this option may be used when individual/user is not able to press the buttons.

As per one of the preferred embodiment of the present invention the method and system for emergency response wherein Voice command may be a command (Alphanumeric 4 digit unique number) to start the program followed by option (A)/(B) to connect to appropriate agency.

As per one another embodiment of the present invention the method and system for emergency response, the system also can be used as a monitoring tool that can be fitted in a transport vehicle to monitor the vehicle from source to destination for any wrong doings, enabling to eradicate/reduce malpractises, adulterations, etc.

As per one another embodiment of the present invention the method and system for emergency response wherein the system is used for monitoring the system example Device get activated if vehicle is stationary for 15 minutes assumptions of time, this may vary/customised, and may capture video/audio data of the surroundings and further sends the capture data may be periodically or in continuous capture and may send it to owner server (to the office server of the company, user of mechanical automation device used for automotive and home/office security has the option to set select customize response where in user gets response to his mobile/landline/computer/any device that's capable of receiving data-audio/video/pictures), recording activity of the vehicle this enable to keep strict surveillance of the vehicle in prohibiting stopping any/all kind of adulterations As per one another embodiment of the present invention the method and system for emergency response wherein the system is used for monitoring Personal Vehicle security and owner safety, the system may get activated if the vehicle is forcibly set on/started without inserting proper key, devise gets activated and send notification to the owner (registered mobile number), video and audio data is captured to the project server and can be provided to agencies on request as piece of evidence for prosecution As per one another embodiment of the present invention the method and system for emergency response on major impact (accidents) the device gets activated and establishes connectivity process for connection with button A and button B.

As per one another embodiment of the present invention the method and system for emergency response during fire/gas leaks sensor enables activation of button A and B to send signals which activates fire functionality and sends messages to fire/police. ( )

As per one another embodiment of the present invention the method and system for emergency response, the device gets activated when forcibly tried to open. Notification goes to owner's mobile number and video and audio data are captured in the device as well as to the project server.

As per one another embodiment of the present invention the method and system for emergency response, when someone tries to break/damage the device physically, Connectivity is established—the chain of connection starts like sms to contacts, to police agencies, to server. Incase where connection is requested and disconnected as device is damaged, notification alert goes to agencies.

As per one another embodiment of the present invention the method and system for emergency response, there is spring attached beneath the memory card area which triggers on forcible opening of the device and flies out due to spring action, this memory card is coated with chemical dye which is not visible with naked eyes, which can be seen only through infrared glasses.

This piece of information will be confidential to police agencies to use them to trace the device in the crime area.

As per one another embodiment of the present invention the method and system for emergency response, during terror strike a dedicated button (TS) when pressed tries to connect (A), if connection is lost or no coverage/low coverage, Satellite phone connection can be used for communication with agencies. TS button gets highest priority and connection stays, the system keeps track on the location.

As per one another embodiment of the present invention the method and system for emergency response, wherein the device is capable of detection of bomb in close proximity, the device may use vapors sensors to smell chemicals used in explosives and send signals immediately to Police or special agencies. This would enable throughout online surveillance where agencies gets alerts, messages on any kind of threats, used as early detections to avoid major mishap occurring, device can also be used as stand alone surveliance device for tracing/giving early warning signals to ATS, bomb scod etc As per one another embodiment of the present invention the method and system for emergency response, wherein delivery of emergency messages as a single instance where in the modules confining the system may carry associative functions of the method for delivery of emergency messages as a single instance.

As per one of the preferred embodiment of the present invention a system for delivery of emergency messages in which the subscriber may have the greatest probability of successful transmittance of the emergency message may be as instance of transmission may comprise of an input device to receive user input, a coder-decoder to perform the decoding/coding may be to achieve compression/decompression of the emergency text message to a single message, processing unit may be to determine the level of compression/decompression to be performed and may be to control the operation of the system, display device to display the display data may be generated by the processing unit, data transfer and communication may be to trans-receive the data and/or control signal from the remote location.

As per one of the preferred embodiment of the present invention a method for delivery of emergency messages which the subscriber may have the greatest probability of successful transmittance of the emergency message may be as instance of transmission wherein the subscriber/consumer/user may generate the message. This input may be received by the input device. The input device may forward the received data to the processing unit. The processing unit may process the received data may be to determine the level of compression/decompression to be performed and may set respective control inputs to the coder-decoder and may forward the data received from the input device to the coder-decoder may be to perform the decoding/coding may be to achieve compression/decompression of the emergency text message to a single message. The data transfer and communication may be responsible to trans-receive the data may send the compressed emergency message to a Telecom Provider. The telecom Provider may then send the message to intended recipient(s). The recipient(s) in turn may have the compressed message system or may not have the system. The recipient(s) may read the message using the compressed message system or may simply read the message as part of the device bundled message.

As per one of the preferred embodiment of the present invention a system for delivery of emergency messages in which the subscriber may have the greatest probability of successful transmittance of the emergency message may be as instance of transmission may comprise of plurality of servers and server networks, plurality of databases, at least on communication link, and at least one user device. The user device comprise of power source to power the user device, plurality of display drivers, plurality of LED drivers to activate and functionalize plurality of LEDs, plurality of LEDs for status indication, at least one IR LED and detectors for night vision, at least one visible spectrum laser LED to be used as emergency light indication, plurality of key buttons to receive activation and other commend inputs from the user, at least one Mic unit to capture audio, at least one audio processor, at least one on board eMMC memory for boot image and storage, plurality of picture cameras to capture picture when activated, at least one video camera to capture video and capable of rotating to capture wide angled video, plurality of processors in order to have HD video on plurality cameras and to have communication path over Ethernet, PCI/SPI etc., at least one satellite transceiver module for wireless emergency communication, and at least one central processing unit comprising of a connectivity module to provide communication connectivity across various communication protocol, at least one display and camera interface, at least one imaging processing unit, internal memory such as ROM/Ram, a system control unit, multimedia unit Cache memory and power management unit.

As per one of the preferred embodiment of the present invention a method for delivery of emergency messages in which the subscriber may have the greatest probability of successful transmittance of the emergency message may be as instance of transmission may comprising steps of activating the user device by press of key button by user, on receiving the activation signal from the key button initializing the connectivity to the service providers network through authenticated access wherein the authentication is provided by service provider, activating the input devices such as plurality of cameras, audio input device such as mic, transferring the captured data from the input devices to the central processing unit for processing the data and encrypting in a package format that is acceptable to the communication protocol and that can be decrypted and understood by the destination server, transmitting the packet data to the destination server, receiving the transmitted packet from the user device, decrypting and decoding the data and forwarding the assistance request to the appropriate assistance station/team. Monitoring and continuously receiving the data from the site of request of assistance, disconnecting the connectivity from the server once the appropriate assistance is provided. The described method steps are carried with the help of various system components and elements such as plurality of servers and server networks, plurality of databases, at least on communication link, at least one user device. The user device comprise of power source to power the user device, plurality of display drivers, plurality of LED drivers to activate and functionalize plurality of LEDs, plurality of LEDs for status indication, at least one IR LED and detectors for night vision, at least one visible spectrum laser LED to be used as emergency light indication, plurality of key buttons to receive activation and other commend inputs from the user, at least one Mic unit to capture audio, at least one audio processor, at least one on board eMMC memory for boot image and storage, plurality of picture cameras to capture picture when activated, at least one video camera to capture video and capable of rotating to capture wide angled video, plurality of processors in order to have HD video on plurality cameras and to have communication path over Ethernet, PCI/SPI etc., at least one satellite transceiver module for wireless emergency communication, and at least one central processing unit comprising of a connectivity module to provide communication connectivity across various communication protocol, at least one display and camera interface, at least one imaging processing unit, internal memory such as ROM/Ram, a system control unit, multimedia unit Cache memory and power management unit.

A system for delivery of emergency messages in which the user may have the greatest probability of successful transmittance of the emergency message, the system comprise a plurality of servers, a plurality of server networks, a plurality of databases, a plurality of storage unit, at least one communication link, a plurality of user devices, at least one user device comprise at least one power source, D.C. power source to power the user device, a plurality of display drivers, a plurality of LEDs for status indication, at least one IR LED, at least one IR detectors for night vision, at least one visible spectrum laser LED to be used as emergency light indication, a plurality of LED drivers to activate and functionalize plurality of LEDs, plurality of key buttons to receive activation and other inputs from the user, at least one Mic unit to capture audio, at least one speaker to play recorded emergency response multilingual request, at least one audio processor to process the audio, at least one on board eMMC memory for boot image and storage, plurality of picture cameras to capture picture when activated, at least one video camera to capture video and capable of rotating to capture wide angled video, plurality of processors in order to have HD video on plurality of cameras and to have communication path over Ethernet, PCI/SPI etc., at least one satellite transreceiver module for wireless emergency communication, plurality of sensors, and 1. at least one central processing unit, central processing unit comprise a connectivity module to provide communication connectivity across various communication protocol, at least one display and camera interface, at least one imaging processing unit, a plurality of internal memories such as ROM/Ram, at least one system control unit, at least one multimedia unit, a Cache memory and at least one power management unit. As per one of the embodiment of the present invention plurality of servers include system servers, destination servers, service provider servers, agency servers multiple server or mirror servers which are designed and implemented to cut down the travel route time. The plurality of server networks includes networks formed through system servers, destination servers, service provider servers, agency servers and plurality of user devices. The plurality of databases includes the database for storing the request calls, database for user records, database for user data and user authentication. The communication networks include wired and wireless communication networks. The communication networks are based on at least one communication protocol, communication protocol includes PCI, USB, UART, S/PDIF, Ethernet, Bluetooth WiFi etc. The connectivity module of the central processing unit identifies a suitable communication protocol compatible to the destination server communication protocol and establish communication link. In case of no direct connectivity to the server, the connectivity module of the central processing unit of first user device identifies second nearest user device and communicate the data to the nearest user device through compatible communication protocol, thus achieving the network connectivity to the destination server and establish communication link through hopping of data from one user device to another. The central processing unit receives input/monitoring data inputs from the peripheral input devices such as picture camera, video camera, audio input device i.e. Mic, plurality of key buttons. the central processing unit processes the data and encrypting in a package format that is acceptable to the communication protocol over the communication link established. The plurality of key buttons of the User device provide user interface for registrations of the user in the user database. The plurality of sensors include fire sensor, smoke sensor, light sensors, temperature sensors, humidity sensors etc. The plurality of key buttons of the User device provide user interface for receiving the activation signal/command. The at least one mic unit of the User device provide audio interface for receiving the activation signal/command as audio input/voice command. The plurality of picture camera and at least one video camera can be constituted as single camera unit. The system control unit periodically asserts/activates all the component of the system to validate and ensure the uptime of the system.

As per one of the embodiment of the present invention the USB PHY of the connectivity module in conjunction with the configured memory of the user device enables the user device to be used as portable USB flash drive.

As per one of the embodiment of the present invention the Bluetooth protocol implemented at the connectivity module in conjunction with the configured mic and speaker enables the user device to be used as portable—hands free module.

As per one of the embodiment of the present invention the WiFi protocol implemented at the connectivity module in conjunction with the configured UART, PCI, SATA phy, Ethernet protocols enables the user device to be used as dongle for network connectivity.

As per one of the embodiment of the present invention the WiFi protocol implemented at the connectivity module enables the user device to be used as dongle creating WiFi hot spot.

A method for delivery of emergency messages in which the user may have the greatest probability of successful transmittance of the emergency message, the method comprising steps of registering at least one user at the user database, set up emergency response request, activate input capturing devices such as picture cameras, video cameras, mic, Setup and activate sensor devices, Initiate the connection process to activate set up communication link, Detect the available network coverage and strength of the available network coverage, Identify the compatible communication protocol between the destination server and user device, Identify the user initiating the request at the service provider server, performs authenticity check and performs its usual connectivity procedures to ascertain the request call reaches to the service provider server and record/logs data in the database for the requestor, Decode the emergency response request to determine which agency server the emergency response request shall be forwarded, Service provider server opens connectivity to appropriate agency server and data then traverses to agency server, Store the data captured by input devices such as cameras, mic, sensors etc. in local device, along with text file created with desired message for appropriate agency in case no standard network coverage is available, Repeatedly execute the connection initiation/request until it gets coverage to send/dispatch the created file to relevant agency, Establish Satellite phone connectivity jin case of repeated failure of connection request, Execute disconnection process as soon as the connection field is updated with stop record and disconnect the user device from the server. The emergency response request is set up by pressing respective key button. The emergency response request is set up by voice command. The emergency response request takes nearest route that is specifically designed to receive data for the region where the user is located. The process of registration of user updates the fields in the database in the server, the fields includes but not limited to name, address, contact—details of all the specified contact, user location, video, audio, jurisdiction, status, remark, Medical details—Family Dr. number, Medical history details—Alergetic, diabetic, . . . , Medical claims details policy/insurance, List of hospitals (with reference to medical insurance list), Specialty hospitals. The disconnection of connectivity module is sole ownership and call of the agent server's admin/controller in charge. The plurality of servers include system servers, destination servers, service provider servers, agency servers. The plurality of servers include multiple server or mirror servers which are designed and implemented to cut down the travel route time. The plurality of server networks includes networks formed through system servers, destination servers, service provider servers, agency servers and plurality of user devices. The plurality of databases includes the database for storing the request calls, database for user records, database for user data and user authentication. The communication networks include wired and wireless communication networks. The communication networks are based on at least one communication protocol, communication protocol includes PCI, USB, UART, S/PDIF, Ethernet etc. The communication link is establish by identifying suitable communication protocol compatible to the destination server communication protocol through the connectivity module of the central processing unit. The connectivity module of the central processing unit of first user device identifies second nearest user device and communicate the data to the nearest user device through compatible communication protocol, to achieve the network connectivity to the destination server and establish communication link through hopping of data from one user device to another in case of no direct connectivity to the server. The input/monitoring data inputs from the peripheral input devices such as picture camera, video camera, audio input device i.e. Mic, plurality of key buttons are received through central processing unit. The data is processed and encrypted in a package format that is acceptable to the communication protocol over the communication link established by central processing unit. The activation signal/command are received from the user through plurality of key buttons of the User device. The audio interface for receiving the activation signal/command as audio input/voice command is provided through at least one mic unit of the User device. The periodical assertion/activation of all the component of the system to validate and ensure the uptime of the system is performed by system control unit.

As per one of the embodiment of the present invention, the device is specifically designed to run at ease and easy and clear understandable multilingual to be used by rural urban, women, men senior citizen even without much know how of technology, the gadget device is compatible with latest technology but is intended to be used by click of buttons, events that is easy to use by everyone.

The present invention may overcome the challenges of the current scenario through the automatic and quick encryption and mapping features. The present invention may produce result providing transmittance of the emergency message.

The invention claimed is:

1. A system for delivery of emergency messages in which a user may have the greatest probability of successful transmittance of the emergency message, the system comprise:

a plurality of servers;
a plurality of server networks; a plurality of databases; a plurality of storage unit; at least one communication link;
a plurality of user devices, at least one user device comprise:
  at least one power source, D.C. power source to power the user device;
  a plurality of display drivers; a plurality of LEDs for status indication;
  at least one IR LED;
  at least one IR detectors for night vision;
  at least one visible spectrum laser LED to be used as emergency light indication;
  a plurality of LED drivers to activate and functionalize plurality of LEDs;
  plurality of key buttons to receive activation and other inputs from the user;
  at least one Mic unit to capture audio;
  at least one speaker to play recorded emergency response multilingual request;
  at least one audio processor to process the audio;
  at least one on board eMMC memory for boot image and storage;
  plurality of picture cameras to capture picture when activated;
  at least one video camera to capture video and capable of rotating to capture wide angled video;
  plurality of processors in order to have HD video on plurality of cameras and to have communication path over Ethernet, PCI/SPI etc.;
  at least one satellite transreceiver module for wireless emergency communication; plurality of sensors; and
  at least one central processing unit, central processing unit comprise:
    a connectivity module to provide communication connectivity across various communication protocol;
    at least one display and camera interface;
    at least one imaging processing unit;
    a plurality of internal memories such as ROM/Ram;
    at least one system control unit;
    at least one multimedia unit; a Cache memory; and
    at least one power management unit;
    wherein when request for police assistance is received through key button the connectivity module of the device establishes connectivity in any of the case of standard coverage connectivity or failover connectivity; execute functionality of activating at least one camera and at least one mic for recording video and audio: transfer buffered video and audio to the system server and agency server;

wherein the system server broadcast name, location, and audio message from requester to the police walky talky as soon as the records for the user are inserted in the database wherein when request for medical assistance is received through key button the connectivity module of the device establishes connectivity in any of the case of standard coverage connectivity or failover connectivity; identifies the most appropriate medical agency in the vicinity; execute functionality of activating at least one camera and at least one mic for recording video and audio; transfer buffered video and audio to the system server and medical agency server; make available data such as name, address, contact—details of all the specified contact, user location, video, audio, jurisdiction, status, remark, Medical details—Family Dr. number, Medical history details—Alergetic, diabetic, . . . , Medical claims details: policy/insurance, to the medical agency;

wherein when request for assistance is received through key button the speaker of the system plays recorded messages;

wherein disconnection of connectivity module is sole ownership and call of the system server's admin/controller in charge, and there is no option from device to disconnect the connection, in case request for assistance is received;

wherein in case there is an interruption or call drop during ongoing connection, the system automatically redials connectivity module and tries to establish connection again, if there is a drop of connectivity multiple time to an ongoing connection, alert messaged is flashed to the respective agencies along with rendering of the data which is continuous process till the connection lasts, notifying the agencies to build up an action plan and expecting delayed data, etc.;

wherein CR functionality to provide direct connectivity to media is activated upon activation of CR button wherein when someone tries to break/damage the device physically, the system Connectivity is established through the chain of connection starts like sms to contacts, to police agencies, to server; and wherein when someone tries to break/damage the device and where connection is requested and disconnected as system is damaged, notification alert is forwarded to agencies.

2. The system as claimed in claim 1 wherein plurality of servers include system servers, destination servers, service provider servers, agency servers.

3. The system as claimed in claim 1 wherein plurality of servers include multiple server or mirror servers which are designed and implemented to cut down the travel route time.

4. The system as claimed in claim 1 wherein the plurality of server networks includes networks formed through system servers, destination servers, service provider servers, agency servers and plurality of user devices.

5. The system as claimed in claim 1 wherein the plurality of databases includes the database for storing the request calls, database for user records, database for user data and user authentication.

6. The system as claimed in claim 1, wherein the communication networks include wired and wireless communication networks.

7. The system as claimed in claim 1, wherein the communication networks are based on at least one communication protocol, communication protocol includes PCI, USB, UART, S/PDIF, Ethernet etc.

8. The system as claimed in claim 1, wherein the connectivity module of the central processing unit identifies a suitable communication protocol compatible to the destination server communication protocol and establish communication link.

9. The system as claimed in claim 1, wherein in case of no direct connectivity to the server, the connectivity module of the central processing unit of first user device identifies second nearest user device and communicate the data to the nearest user device through compatible communication protocol, thus achieving the network connectivity to the destination server and establish communication link through hopping of data from one user device to another.

10. The system as claimed in claim 1, wherein the central processing unit receives input/monitoring data inputs from the peripheral input devices such as picture camera, video camera, audio input device i.e. Mic, plurality of key buttons.

11. The system as claimed in claim 1, wherein the central processing unit processing the data and encrypting in a package format that is acceptable to the communication protocol over the communication link established.

12. The system as claimed in claim 1, wherein the plurality of key buttons of the User device provide user interface for registrations of the user in the user database.

13. The system as claimed in claim 1, wherein the plurality of sensors include fire sensor, smoke sensor, light sensors, temperature sensors, humidity sensors etc.

14. The system as claimed in claim 1, wherein the plurality of key buttons of the User device provide user interface for receiving the activation signal/command.

15. The system as claimed in claim 1, wherein the at least one mic unit of the User device provide audio interface for receiving the activation signal/command as audio input/voice command.

16. The system as claimed in claim 1, wherein the plurality of picture camera and at least one video camera can be constituted as single camera unit.

17. The system as claimed in claim 1, wherein the system control unit periodically asserts/activates all the component of the system to validate and ensure the uptime of the system.

18. The system as claimed in claim 1, wherein the USB PHY of the connectivity module in conjunction with the configured memory of the user device enables the user device to be used as portable USB flash drive.

19. The system as claimed in claim 1, wherein the Bluetooth protocol implemented at the connectivity module in conjunction with the configured mic and speaker enables the user device to be used as portable—hands free module.

20. The system as claimed in claim 1, wherein the WiFi protocol implemented at the connectivity module in conjunction with the configured UART, PCI, SATA phy, Ethernet protocols enables the user device to be used as dongle for network connectivity.

21. The system as claimed in claim 1, wherein the WiFi protocol implemented at the connectivity module enables the user device to be used as dongle creating WiFi hot spot.

22. A method for delivery of emergency messages in which the user may have the greatest probability of successful transmittance of the emergency message, the method comprising steps of:

registering at least one user at the user database;

set up emergency response request activate input capturing devices such as picture cameras, video cameras, mic;

setup and activate sensor devices;

initiate the connection process to activate set up communication link;

detect the available network coverage and strength of the available network coverage;

identify the compatible communication protocol between the destination server and user device;

identify the user initiating the request at the service provider server;

performs authenticity check and performs its usual connectivity procedures to ascertain the request call reaches to the service provider server and record/logs data in the database for the requestor;

decode the emergency response request to determine which agency server the emergency response request shall be forwarded;

service provider server opens connectivity to appropriate agency server and data then traverses to agency server;

store the data captured by input devices such as cameras, mic, sensors, etc., in local device, along with text file created with desired message for appropriate agency in case no standard network coverage is available;

repeatedly execute the connection initiation/request until it gets coverage to send/dispatch the created file to relevant agency;

establish satellite phone connectivity in case of repeated failure of connection request; and establish connectivity in any of the case of standard coverage connectivity or failover connectivity, transfer buffered video and audio to the system server and agency server when request for police assistance is received;

broadcast name, location and audio message from requester to the police walkie talkie as soon as the records for the user are inserted in the database when request for police assistance is received;

establish connectivity in any of the case of standard coverage connectivity or failover connectivity, identifies the most appropriate medical agency in the vicinity, transfer buffered video and audio to the system server and medical agency server and make available data such as name, address, contact, details of all the specified contact, user location, video, audio, jurisdiction, status, remark, medical details family doctor number, medical history details alergetic, diabetic, Medical claims details policy/insurance, to the medical agency when request for medical assistance is received;

play recorded messages through the speaker of the system when request for assistance is received through key button;

disconnect the connectivity module only through system server's admin/controller in charge, only after satisfactory management of assistance, in case request for assistance is received;

automatically redial connectivity module and try to establish connection again, and if there is a drop of connectivity multiple time to an ongoing connection, flash an alert messaged to the respective agencies along with rendering of the data which is continuous process till the connection lasts, notifying the agencies to build up an action plan and expecting delayed data, etc., when there is an interruption or call drop during ongoing connection;

activate CR functionality to provide direct connectivity to media upon activation of CR button;

established the system connectivity through the chain of connection starts like SMS to contacts, to police agencies, to server when someone tries to break/damage the device physically;

forward notification alert to agencies when someone tries to break/damage the device and where connection is requested and disconnected as system is damaged; and execute disconnection process as soon as the connection field is updated with stop record and disconnect the user device from the server.

23. The method as claimed in claim 22, wherein the emergency response request is set up by pressing respective key button.

24. The method as claimed in claim 22, wherein the emergency response request is set up by voice command.

25. The method as claimed in claim 22, wherein the emergency response request takes nearest route that is specifically designed to receive data for the region where the user is located.

26. The method as claimed in claim 22, wherein the process of registration of user updates the fields in the database in the server, the fields includes but not limited to name, address, contact details of all the specified contact, user location, video, audio, jurisdiction, status, remark, medical details family doctor's number, medical history details, Alergetic, diabetic, Medical claims details:
policy/insurance, a list of hospitals (with reference to medical insurance list), specialty hospitals.

27. The method as claimed in claim 22, wherein the disconnection of connectivity module is sole ownership and call of the agent server's admin/controller in charge.

28. The method as claimed in claim 22 wherein plurality of servers include system servers, destination servers, service provider servers, agency servers.

29. The method as claimed in claim 22 wherein plurality of servers include multiple server or mirror servers which are designed and implemented to cut down the travel route time.

30. The method as claimed in claim 22 wherein the plurality of server networks includes networks formed through system servers, destination servers, service provider servers, agency servers and plurality of user devices.

31. The method as claimed in claim 22 wherein the plurality of databases includes the database for storing the request calls, database for user records, database for user data and user authentication.

32. The method as claimed in claim 22, wherein the communication networks include wired and wireless communication networks.

33. The method as claimed in claim 22, wherein the communication networks are based on at least one communication protocol, communication protocol includes PCI, USB, UART, S/PDIF, Ethernet etc.

34. The method as claimed in claim 22, wherein a communication link is establish by identifying suitable communication protocol compatible to the destination server communication protocol through the connectivity module of the central processing unit.

35. The method as claimed in claim 22, wherein the connectivity module of the central processing unit of first user device identifies second nearest user device and communicate the data to the nearest user device through compatible communication protocol, to achieve the network connectivity to the destination server and establish communication link through hopping of data from one user device to another in case of no direct connectivity to the server.

36. The method as claimed in claim 22, wherein the input/monitoring data inputs from the peripheral input devices such as picture camera, video camera, audio input device i.e. Mic, plurality of key buttons are received through central processing unit.

37. The method as claimed in claim 22, wherein the data is processed and encrypted in a package format that is acceptable to the communication protocol over the communication link established by central processing unit.

38. The method as claimed in claim 22, wherein the activation signal/command are received from the user through plurality of key buttons of the User device.

39. The method as claimed in claim 22, wherein the audio interface for receiving the activation signal/command as audio input/voice command is provided through at least one mic unit of the User device.

40. The method as claimed in claim 22, wherein the periodical assertion/activation of all the component of the system to validate and ensure the uptime of the system is performed by system control unit.

* * * * *